US008031756B2

(12) United States Patent
Yamasuge (10) Patent No.: US 8,031,756 B2
(45) Date of Patent: Oct. 4, 2011

(54) COMMUNICATION DEVICE, COMMUNICATION METHOD, COMMUNICATION SYSTEM AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 12/127,098

(22) Filed: May 27, 2008

(65) Prior Publication Data

US 2008/0291976 A1    Nov. 27, 2008

(30) Foreign Application Priority Data

May 24, 2007 (JP) ................................ P2007-138174

(51) Int. Cl.
*H04B 1/713* (2011.01)
(52) U.S. Cl. ........ 375/132; 375/136; 375/137; 375/267; 375/346; 375/347; 375/349
(58) Field of Classification Search .................. 375/132, 375/136, 137, 267, 346, 347, 349
See application file for complete search history.

(56) References Cited

U.S. PATENT DOCUMENTS

| 5,392,300 | A | | 2/1995 | Borth et al. |
| 6,044,106 | A | * | 3/2000 | Suzuki ........................ 375/219 |
| 7,069,052 | B2 | * | 6/2006 | Ylitalo ...................... 455/562.1 |
| 2005/0007987 | A1 | | 1/2005 | Yagi et al. |

FOREIGN PATENT DOCUMENTS

| JP | 6-61894 | 3/1994 |
| JP | 8-503345 | 4/1996 |
| JP | 2000-332668 | 11/2000 |
| JP | 2000-353998 | 12/2000 |
| JP | 2001-298388 | 10/2001 |
| JP | 2005-6116 | 1/2005 |
| JP | 2005-33414 | 2/2005 |
| JP | 2006-100887 | 4/2006 |

OTHER PUBLICATIONS

D. Torrieri et al., "Adaptive and Diversity Arrays for Frequency-Hopping Systems," Military Communications Conference Proceedings, MILCOM 1999, IEEE, vol. 2, pp. 929-933 (1999).

* cited by examiner

*Primary Examiner* — Chieh M Fan
*Assistant Examiner* — Siu Lee
(74) *Attorney, Agent, or Firm* — Finnegan, Henderson, Farabow, Garrett & Dunner, L.L.P.

(57) ABSTRACT

A communication device of the present invention includes channel compensations, an adaptive processor, a MAC and a controller. The channel compensations weight each of signals received by a plurality of antennas based on an SN ratio of the received signals so as to control the antennas to operate as combining diversity systems. The adaptive processor weights each of the signals received by the plurality of antennas so as to suppress the interference signal and to control the antennas to operate as adaptive array antennas. The MAC detects frequency hopping information of the received signals. The controller changes between the operation of the combining diversity systems and the operation of the adaptive array antennas, based on the frequency hopping information.

9 Claims, 5 Drawing Sheets

COMMUNICATION DEVICE, COMMUNICATION METHOD, COMMUNICATION SYSTEM AND PROGRAM

CROSS REFERENCES TO RELATED APPLICATIONS

The present invention contains subject matter related to Japanese Patent Application JP 2007-138174 filed in the Japan Patent Office on May 24, 2007, the entire contents of which being incorporated herein by reference.

BACKGROUND OF THE INVENTION

1. Field of the Invention

The present invention relates to a communication device, a communication method, a communication system and a program.

2. Description of the Rated Art

In the past, Japanese Patent Application Laid-Open No, 2005-33414 discloses a wireless communication device in a frequency hopping system using a plurality of slots. This wireless communication device selects a plurality of frequencies used in the same frame, in a combination having low correlation with fading characteristics of a wireless propagation and spectral width of another device using the same frequency band, thereby enhancing the effect of the frequency diversity system.

JP-A No. 2000-353998 discloses a diversity sender device that switches a plurality of antennas at predetermined switching frequencies when sequentially switching the antennas so as to demodulate a received signal(s), thereby attaining the diversity effect.

JP-A No. 6-61894discloses a power inversion adaptive array system (adaptive array antenna) that implements an inverse phase combination of the interference signals between the diversity branches, in order to eliminate the broadband interference signal

[Patent Document 1] JP-A 2005-33414
[Patent Document 2] JP-A 2000-353998
[Patent Document 3] JP-A 6-61894

SUMMARY OF THE INVENTION

However, when the frequency hopping is not implemented in the combining diversity system, the interference signal may not be suppressed, if the interference signal overlaps with its frequency band. This results in an issue that its reception characteristics are deteriorated.

In the case of the adaptive array antenna, when the frequency hopping is implemented, there is no sufficient amount of information necessary for an adaptive process in an arbitrary band, and the factor for weighting the antennas may not be obtained with high accuracy. To implement the adaptive process, it is necessary to operate an exclusive processor. This results in an issue of increasing the power consumption.

The present invention has been made in consideration of the above issues. It is accordingly desirable to provide a new and improved communication device, communication method, communication system and program therefore, for optimally implementing an adaptive process in accordance with a received signal, thereby realizing low power consumption and suppressing the interference signal.

According to an embodiment of the present invention, there is provided a communication device including: a first weighting controller which weights each of signals received by a plurality of antennas based on an SN ratio of the received signals so as to operate the antennas as combining diversity systems; a second weighting controller which weights each of the signals received by the plurality of antennas so as to suppress an interference signal and to operate the antennas as adaptive array antennas; a hopping information detector which detects frequency hopping information of the received signals; and a control switch which changes between an operation of the combining diversity systems and an operation of the adaptive array antennas based on the frequency hopping information.

According to the above embodiment, the first weighting controller weights each of signals received by a plurality of antennas based on an SN ratio of the received signals and to control the antennas to operate as combining diversity systems. The second weighting controller weights each of signals received by a plurality of antennas so as to suppress the interference signal and to control the antennas to operate as adaptive array antennas. Upon detection of frequency hopping information of the received signals, an operation of the combining diversity system is changed to/from an operation of the adaptive; array antenna based on the frequency hopping information. Thus, it is possible to optimally change between the combining diversity system and the adaptive array antenna based on the frequency hopping information, thereby optimizing the state of reception and attaining low power consumption.

The control switch may set the combining diversity systems to operate, when frequency hoping is implemented. According to this configuration, when the frequency hopping is implemented, the antennas operate as the combining diversity systems, thus can receive information using a plurality of hopping bands, resulting in the preferable state of reception.

The control switch may stop the second weighting controller to operate, when frequency hopping is implemented. According to this configuration, when the frequency hopping is implemented, the antennas are controlled to operate as combining diversity systems, and the operation of the second weighting controller is stopped, thus minimizing the power consumption.

The first weighting controller may weight each of the signals using a first weighting factor for changing gain of each of the received signals. According to this configuration, the gain of each of the received signals can be changed based on the SN ratio of the received signals, using the first weighting factor, thus optimizing the state of reception with the combining diversity systems, The second weighting controller may weight each of the signals using a second weighting factor for changing gain and phase of each of the received signals. According to this configuration, the gain and phase of each of the received signals can be changed so as to suppress the interference signal, using the second weighting factor, thus optimizing the state of reception with the adaptive array antennas.

The second weighting controller may compare a channel, estimation signal and a known signal previously stored in association with the channel estimation signal so as to calculate the second weighting factor. According to this configuration, the second weighting factor can be converged so as to suppress the interference signal, based on the channel estimation signal included in the packet signal.

According to another embodiment of the present invention, there is provided a communication method including the steps of: detecting frequency hopping information of a received signal; weighting each of signals received by a plurality of antennas based on an SN ratio of the received signals so as to operate the antennas as combining diversity systems, when frequency hopping is implemented; and weighting each of the signals received by the plurality of antennas so as to suppress an interference signal and to operate the antennas as adaptive array antennas, when frequency hopping is not implemented.

According to the above configuration, upon detection of the frequency hopping information of the received signals, when the frequency hopping is implemented, each of signals received by a plurality of antennas is weighted based on the SN ratio of the received signals, and the antennas are controlled to operate as combining diversity systems. When the frequency hopping is not implemented, each of signals received by the plurality of antennas can be weighted so as to suppress the interference signal, and the antennas are controlled to operate as adaptive array antennas. Thus, it is possible to optimally change between the combining diversity systems and the adaptive array antennas based on the frequency hopping information, thereby optimizing the state of reception and attaining low power consumption.

According to another embodiment of the present invention, there is provided a communication system in which a sender and a receiver are connected through a wireless communication network, wherein the receiver includes: a first weighting controller which weights each of signals received by a plurality of antennas based on an SN ratio of the received signals so as to operate the antennas as combining diversity systems; a second weighting controller which weights each of the signals received by the plurality of antennas so as to suppress an interference signal and to operate the antennas as adaptive array antennas; a hopping information detector which detects frequency hoping information of the received signals; and a control switch which changes between an operation of the combining diversity systems and an operation of the adaptive array antennas based on the frequency hopping information.

According to the above configuration, the first weighting controller weights each of signals received by a plurality of antennas based on the SN ratio of the received signals and to control the antennas to operate as combining diversity systems. The second weighting controller weights each of the signals received by the plurality of antennas so as to suppress the interference signal, and the antennas are controlled to operate as adaptive array antennas. The frequency hopping information of the received signals is detected, and the operation of the combining diversity systems is switched to/from the operation of the adaptive array antennas based on the frequency hopping information. Thus, it is possible to optimally change between the combining diversity systems and the adaptive array antennas based on the frequency hopping information, thereby optimizing the state of reception and attaining low power consumption, According to another embodiment of the present invention, there is provided a program for controlling a computer to function as; a unit which weights each of signals received by a plurality of antennas based on an SN ratio of the received signals so as to operate the antennas as combining diversity systems; a unit which weights each of the signals received by the plurality of antennas so as to suppress an interference signal and to operate the antennas as adaptive array antennas; a unit which detects frequency hopping information of the received signals; and a unit which changes between an operation of the combining diversity systems and an operation of the adaptive array antennas, based on the frequency hopping information.

According to the above configuration, each of signals received by the plurality of antennas is weighted based on the SN ratio of the received signals, and the antennas are controlled to operate as combining diversity systems. Each of the signals received by the plurality of antennas is weighted so as to suppress the interference signal, and the antennas are controlled to operate as the adaptive array antennas. The frequency hopping information of the received signals is detected, and the operation of the combining diversity systems is changed to/from the operation of the adaptive array antennas based on the frequency hopping information. Thus, it is possible to optimally change between the combining diversity systems and the adaptive array antennas based on the frequency hopping information, thereby optimizing the state of reception and attaining low power consumption, According to the embodiment of the present invention, there are provided a communication device, communication method, communication system and program therefor, for optimally implementing the adaptive process in accordance with the received signals, thereby realizing low power consumption and suppressing the interference signal.

DETAILED DESCRIPTION OF THE PREFERRED EMBODIMENT

Hereinafter, a preferred embodiment of the present invention will be described in detail with reference to the appended drawings. Note that, in this specification and the appended drawings, structural elements that have substantially the same function and structure are denoted with the same reference numerals, and repeated explanations of these structural elements is omitted.

Figure 1:
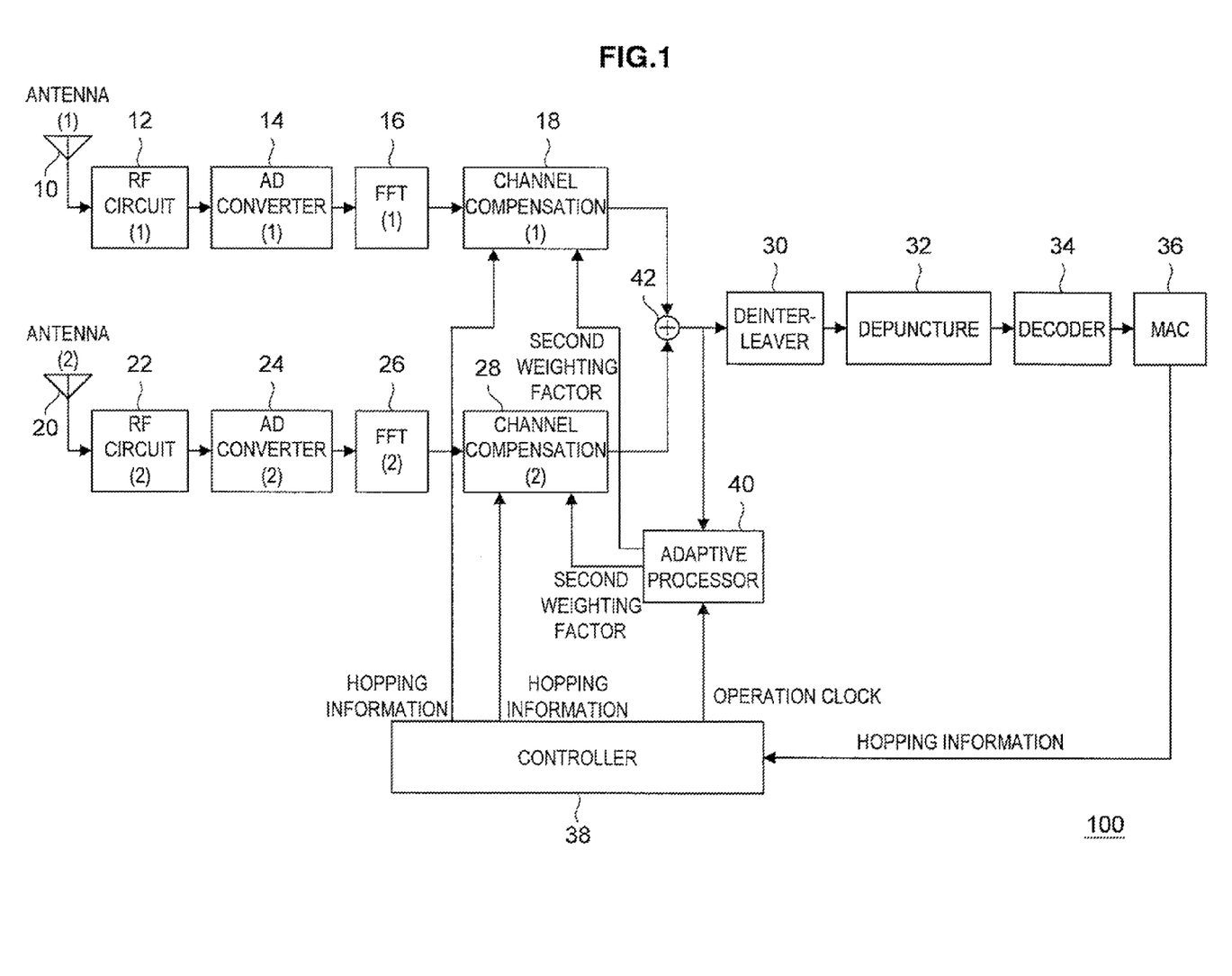
FIG. 1 is an exemplary diagram showing a configuration of a communication device according to one embodiment of the present invention.

FIG. 1 is an exemplary diagram, showing a configuration of a communication device 100 according to an embodiment of the present invention. The communication device 100 according to this embodiment adapts to, for example, an MB-OFDM system using UWB.

As shown in FIG. 1, the communication device 100 has an antenna (1) 10, an RP circuit (1) 12, an AD converter (1) 14, an FFT (1) 16, a Channel Compensation (1) 18, an antenna (2) 20, an RF circuit (2) 22, an AD converter (2) 24, an FFT (2) 26, a Channel Compensation (2) 28, a deinterleaver 30, a depuncture 32, a decoder 34, a MAC 36, a controller 38 and an adaptive processor 40.

In FIG. 1, high frequency signals received by the antennas 10 and 20 are amplified by the RF circuits 12 and 22, and converted to digital signals by the AD converters 14 and 24. The digitally converted received signals are subject to a high speed Fourier transform by FFT 16 and 26 so as to be sent to the channel compensations 18 and 28.

The channel compensations 18 and 28 execute a process for compensating for the channel of the received signals. The signals compensated by the channel compensations 18 and 28 are combined by a combiner 42 and then sent to deinterleaver 30. The deinterleaver 30 executes a process for recovering the interleaved received signals. The received signals output from the deinterleaver 30 are sent to the decoder 32 so as to be decoded. The outputs from the decoder 32 are sent to the MAC 36.

The MAC 36 detects whether frequency hopping is implemented for the received signals. This detection is made based on hopping information included in a beacon signal included in the first part of each of the received signals. The MAC 36 sends information (hopping information) representing that the frequency hopping is implemented to the controller 38, when the frequency hopping is implemented.

The adaptive processor 40 operates upon reception of an operation clock from the controller 38, compares a channel estimation signal(s) (CE) included in a packet signal and a previously acquired known signal, calculates a difference (minimum mean square error) between the channel estimation signal (CE) and the known signal, weights the received signals so as to attain the minimum difference, feeds back the signals by a predetermined range of sample, thereby updating the calculation process. Further, the processor 40 controls the antennas of the communication device 100 to operate as adaptive array antennas, based on a weighting factor (second weighting factor) which has been converged so as to attain the minimum difference.

In this embodiment, the channel compensations 18 and 28 weight the received signals received by the antennas 10 and 20 based on an SN ratio, and weight the signals so as to obtain the excellent reception characteristics to the noise, thereby controlling the antennas of the communication device 100 as combining diversity systems.

The channel compensations 18 and 28 can control the antennas of the communication device 100 as directional adaptive array antennas, based on the weighting of the antennas 10 and 20 that has been calculated by the adaptive processor 40. Descriptions will now be made to operations of the channel compensations 18 and 28 and the adaptive processor 40 based on FIG. 2.

Figure 2:
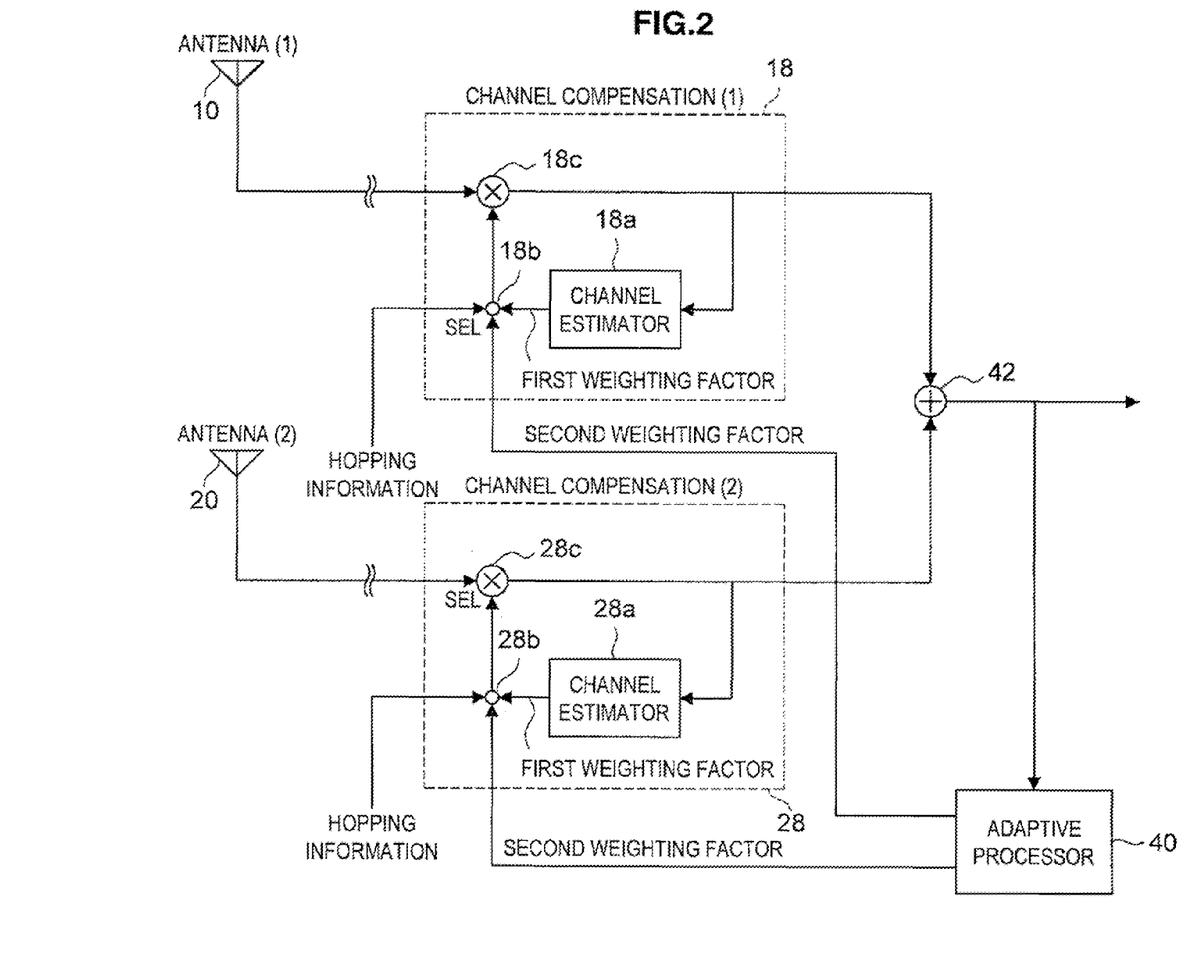
FIG. 2 is an exemplary diagram showing configurations of channel compensations and their periphery.

FIG. 2 is an exemplary diagram showing the configurations of the channel compensations 18 and 28 and their periphery. As shown in FIG. 2, the channel compensations 18 and 28 respectively include channel estimators 18a and 28a. When the antennas of the communication device 100 operate as combining diversity systems, the channel estimators 18a and 28a detect an SN ratio of the signals received by the antennas 10 and 20 based on the channel estimation signal (CE) included in the received packet signal, and obtain first weighting factors for weighting for the antennas 10 and 20 based on the detected ratio. In this case, the signals received by the antennas 10 and 20 are weighted in proportion to the SN ratio, and are combined by the combiner 42. As a result, the effect of the noise can be minimized, thereby improving the reception characteristics.

In operation, the adaptive processor 40 calculates a difference between the channel estimation signal (CE) and a previously acquired known signal, and calculates the second weighting factors for weighting for the antennas 10 and 20 based on the difference.

The channel compensations 18 and 28 respectively include signal switches 18b, 28b and multipliers 18c, 28c. When the adaptive processor 40 is in operation, the signal switches 18b and 28b receive the second weighting factors sent from the adaptive processor 40. In addition, the signal switches 18b and 28b receive hopping information sent from the controller 38.

The signal switches 18b and 28b switch the weighting factors to be input to the multipliers 18c and 28c based on the hopping information sent from the controller 38, and send either of the first weighting factors sent from the channel estimators 18a and 28a and the second weighting factors sent from the adaptive processor 40, to the multipliers 18c and 28c. The multipliers 18c and 28c weight the received signals using the sent weighting factors, When operating as combining diversity systems, as described above, the first weighting factors are multiplied respectively by the received signals in accordance with the SN ratio of the received signals, thereby setting the weighting of the antennas 10 and 20. The first weighting factors are to change mainly the gain of the received signals. The weighting using the; first weighting factor(s) is performed by the channel compensations (1) 18 and (2) 28 respectively corresponding to the antennas 10 and 20, independently at each branch of the antennas 10 and 20.

When operating as adaptive array antennas, the second weighting factors are set so as to determine the directivity from each of the antennas 10 and 20, based on the difference (calculated by the adaptive processor 40) between the channel estimation signal and the known signal. The second weighting factors are to change both the gain and phase of each of the signals, and are so converged and set as to obtain the maximum SINR value of the received signals. As a result, the antenna pattern is controlled not to direct to the interference signal, thereby suppressing the interference signal and improving the reception characteristics. Thus, the antennas 10 and 20 that have been weighted using the second weighting factors function as the adaptive array antennas, and are set to have directivity using the second weighting factors, thereby spatially suppressing the interference signal.

In this embodiment, the hopping information acquired from the MAC 36 Is referred in order to change between the operations as the combining diversity systems using the first weighting factors and the operations as the adaptive array antenna using the second weighting factors. In addition, the hopping information from the MAC 36 is referred in order to perform the operations of the adaptive processor 40.

As described above, the information representing that the frequency hopping is performed or not is acquired from the beacon included in the first part of the transmission signal in the MAC 36. When the frequency hopping is performed, the hopping information is sent from the MAC 36 to the controller 38. The controller 38 does not send an operation clock to the adaptive processor 40 based on the hopping information sent from the MAC 36, during the reception of the hopping information. Thus, the adaptive processor 40 does not operate during the frequency hopping, and the second weighting factors are not calculated.

When the hopping information is not sent, from the MAC 36, the controller 38 sends an operation clock to the adaptive processor 40 to operate the adaptive processor 40. When the frequency hopping is not performed, the adaptive processor 40 calculates the difference between the received channel estimation signal and the known signal, so as to obtain the second weighting factors for controlling the antennas to operate as the adaptive array antenna.

While the hoping information from the MAC 36 is received, the controller 38 sends the hopping information to the channel compensations 18 and 28. The hopping information is sent to the signal switches 18b and 28b of the respective channel compensations 18 and 28. Upon reception of the hopping information, the signal switches 18b and 28b send the first weighting factors sent from the channel estimators 18a and 28a to the multipliers 18c and 28c. As a result, the antennas 10 and 20 are weighted based on the SN ratio, and the antennas of the communication device 100 operate as combining diversity systems.

When the hopping information is not received from the MAC 36, the controller 38 does not send the hopping information to the channel compensations 18 and 28. As described above, when the frequency hopping is not performed, the controller 38 sends an operation clock to the adaptive processor 40 so as to obtain the second weighting factors. When the hopping information is not received from the controller 38, the signal switches 18b and 28b of the channel compensations 18 and 28 send the second weighting factors sent from the adaptive processor 40 to the multipliers 18c and 28c. As a result, the antennas 10 and 20 are weighted based on the second weighting factors, and the antennas of the communication device 100 operate as the adaptive array antennas.

Figure 3A:
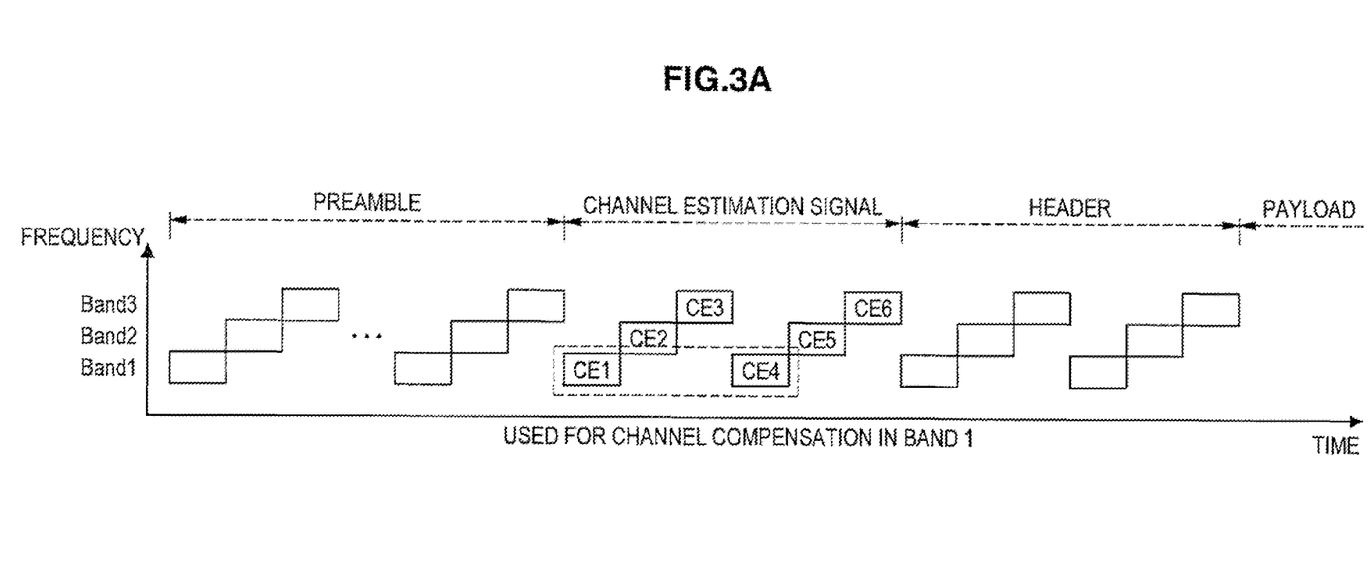
FIG. 3A and FIG. 3B are exemplary diagrams each showing a received signal when frequency hopping is implemented.
Figure 3B:
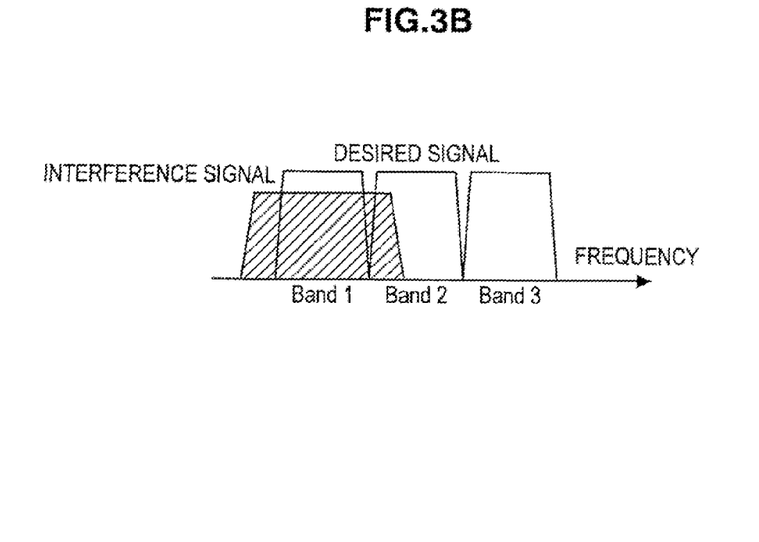

FIG. 3A and FIG. 3B are exemplary diagrams each showing a received signal when the frequency hopping is implemented. As shown in FIG. 3A and FIG. 3B, the packet signal is sent in the order sequentially from a preamble, a channel estimation signal (CE), a header and a payload. As shown in the timing chart of FIG. 3A, when the frequency hopping is implemented, the frequency is changed at predetermined intervals from band 1 to band 3. In the MB-OFDM system using UWB, there are six channel estimation signals CE1 to CE6. The channel estimation Is performed by comparing the channel estimation signals and the known signals in each band.

As shown in FIG. 3A, if the frequency hopping is implemented from band 1 to band 3, two channel estimation signals exist at the same frequency band, because there are six channel estimation signals CE1 to CE6. In the example of FIG. 3A, two channel estimation signals CE1 and CE4 exist in band 1. Also in each of the bands 2 and 3, two channel estimation signals exist in one band. When operating as the adaptive array antenna, it is preferred that more than two channel estimation signals exist in each band, in order to obtain the second weighting factors with high accuracy. Thus, when operating as the adaptive array antenna, it is apprehended that the interference signal may not effectively be suppressed when the interference signal exists, due to a small amount of information regarding the channel estimation signals.

FIG. 3B shows the case where the interference signal exists in band 1, when the frequency hopping is implemented. During the frequency hopping, the reception characteristics of the reception signal can be improved using a known technique, such as interleaving over other bands or time domain spreading, because other bands 2 and 3 can be used even if the interference signal exists in band 1.

Therefore, in this embodiment, when the frequency hopping is implemented, the antennas of the communication device 100 are controlled to operate as combining diversity systems, instead of the adaptive array antennas. Thus, if the interference signal exists in a particular band, another band can be used, and the reception characteristics can be improved using the interleaving technique over other bands or time domain spreading. The operations of the adaptive processor 40 are stopped, thereby realizing low power consumption. The SN ratio in the combining diversity system can be calculated by comparing one channel estimation signal (1 sample) and a known signal.

Figure 4A:
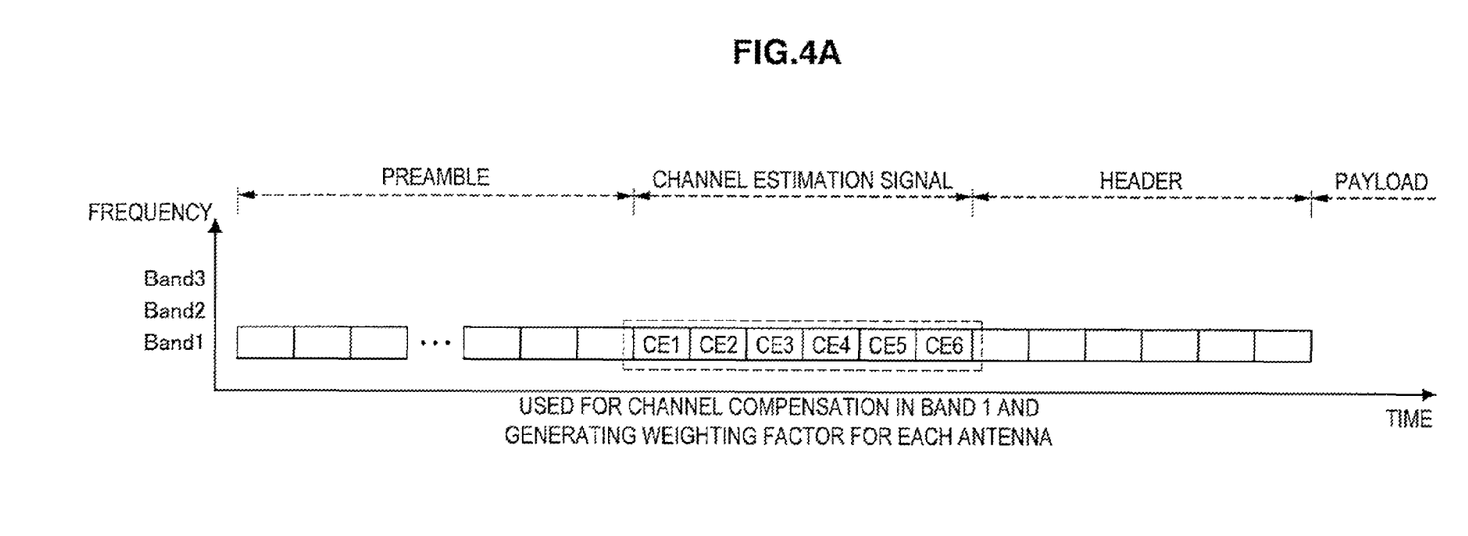
FIG. 4A and FIG. 4B are exemplary diagrams each showing a received signal when frequency hoping is not implemented.
Figure 4B:
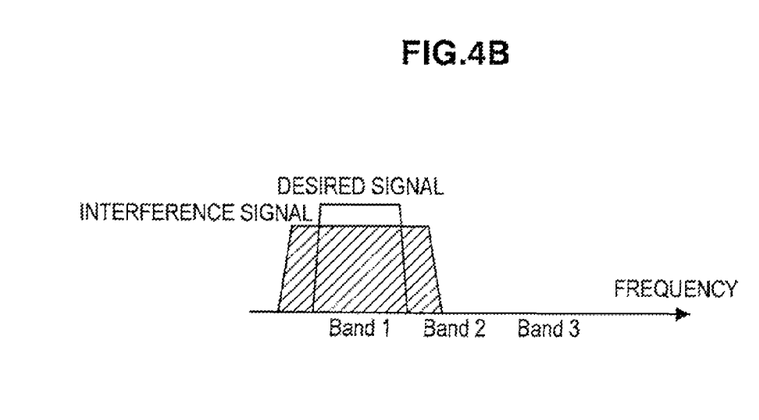

FIG. 4A and FIG. 4B are exemplary diagrams each showing a received signal when the frequency hopping is not implemented. As shown in the timing chart of FIG. 4A, when the frequency hopping is not implemented, all of the six channel estimation signals CE1 to CE6 exist, in the same band, because the packet signals are sent in the same band (band 1). Thus, as compared to the case where the frequency hopping is implemented, all of the six channel estimation signals CE1 to CE6 can be used at the channel estimation in band 1, thus enabling to compare a larger number of channel estimation signals with the known signal with high accuracy. Therefore, when operating as the adaptive array antenna, the channel estimation signals CE1 to CE0 sufficient enough to converge the value of the second weighting factors can be obtained, thus enabling to obtain the second weighting factors with high accuracy.

Accordingly, when the frequency hopping is not implemented, the antennas operate as adaptive array antennas, thereby enabling to use many channel estimation signals existing in one band and enhancing the accuracy of the second weighting factors. As a result, the directivity of the adaptive array antennas can be set with high accuracy.

Figure 5:
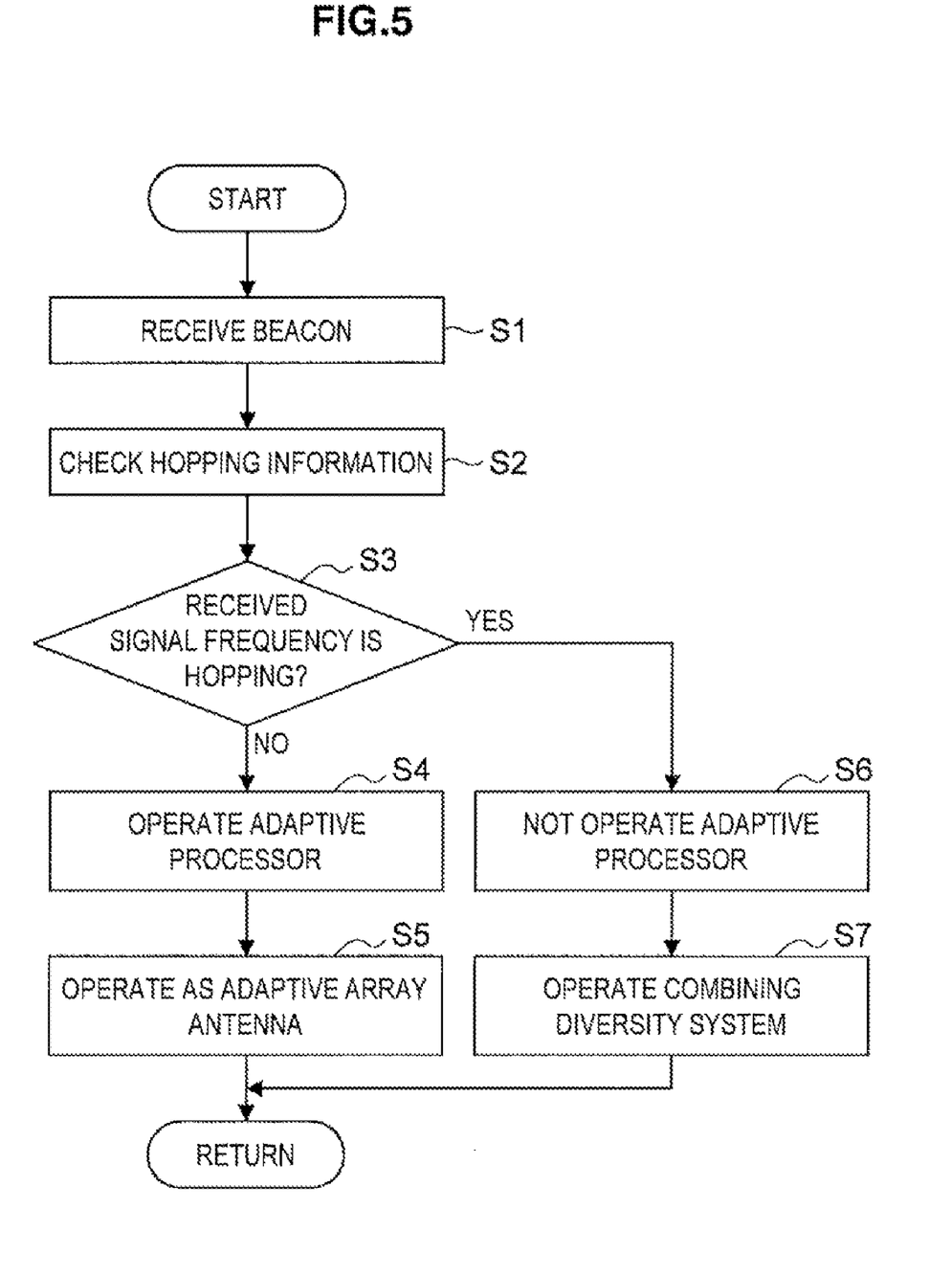
FIG. 5 is a flowchart showing a process executed by the communication device according to the one embodiment of the present invention.

As shown in FIG. 4B, when the frequency hopping Is not implemented, if the interference signal occurs, it is difficult to improve the reception characteristics even using the technique for interleaving over other bands or the time domain spreading technique. That is, it is difficult to suppress the interference signal in the combining diversity systems, if it occurs. In this case, in the communication device 100 of this embodiment, the antennas are controlled to operate as adaptive array antennas so as to have directivity, thereby spatially eliminating the interference signal. Thus, the interference signal can be suppressed so as to improve the reception characteristics, FIG. 5 is a flowchart showing a process executed by the communication device 100 according to this embodiment. The process of FIG. 5 is executed mainly by the controller 38. The program for controlling the controller 38 to realize the process of FIG. 5 can be stored in a storage unit installed inside or outside of the controller 38, for example. First, the controller receives a beacon in Step S1. In Step S2, the controller checks the hopping information from the beacon received in Step S1.

In Step S3, the controller determines whether the received signal is frequency hopped. When the received signal is frequency hopped, the flow proceeds to Step S4, and the operation clock is no longer sent from the controller 38 to the adaptive processor 40, thus stopping the operations of the adaptive processor 40.

After Step S4, the flow proceeds to Step 5. In Step S5, the controller weights each of the antennas 10 and 20 using the first weighting factors so as to control the antennas of the communication device 100 to operate as combining diversity systems.

When the received signal is not frequency hopped in Step S3, the flow proceeds to Step S6. In Step S6, the controller 38 sends an operation clock to the adaptive processor 40 so as to operate the adaptive processor 40. After Step S6, the flow proceeds to Step S7. In Step S7, the processor weights each of the antennas 10 and 20 using the second weighting factors calculated by the adaptive processor 40 so as to control the antennas of the communication device 100 to operate as the adaptive array antennas. After Steps S5 and S7, the process ends (RETURN).

As described, according to this embodiment, when the frequency hopping is implemented, the antennas of the communication device 100 are controlled to operate as the combining diversity systems. Thus, the adaptive processor 40 stops to operate so as to realize low power consumption. When the frequency hopping is not implemented, the adaptive processor 40 is controlled to operate, and the antennas of the communication device 100 are controlled to operate as the adaptive array antennas, thus suppressing the interference signal by the effect of the directivity of the adaptive array antennas and improving the reception characteristics.

It should be understood by those skilled in the art that various modifications, combinations, sub-combinations and alterations may occur depending on design requirements and other factors insofar as they are within the scope of the appended claims or the equivalents thereof.

The preferred embodiment of the present invention has been described with reference to the attached drawings. However, the present invention is not limited to the above. It will be apparent to those skilled in the art that various changes and modifications can be made within the category of technical thoughts as recited in the scope of claim for patent, and it is understood that those changes and modifications naturally belong to the technical category of the invention.

What is claimed is:

1. A communication device comprising:
    a first weighting controller which weights each of signals received by a plurality of antennas based on an signal to noise ratio of the received signals so as to operate the antennas as combining diversity systems;
    a second weighting controller which weights each of the signals received by the plurality of antennas so as to suppress an interference signal and to operate the antennas as adaptive array antennas;
    a hopping information detector which detects frequency hopping information of the received signals; and
    a control switch which changes between an operation of the combining diversity systems and an operation of the adaptive array antennas based on the frequency hopping information.

2. The communication device according to claim 1, wherein
    the control switch sets the combining diversity systems to operate, when frequency hoping is implemented.

3. The communication device according to claim 2, wherein
    the control switch stops the second weighting controller to operate, when frequency hopping is implemented.

4. The communication device according to claim 1, wherein
    the first weighting controller weights each of the received signals using a first weighting factor for changing gain of each of the received signals.

5. The communication device according to claim 1, wherein
    the second weighting controller weights each of the received signals using a second weighting factor for changing gain and phase of each of the received signals.

6. The communication device; according to claim 5, wherein
    the second weighting controller compares a channel estimation signal and a known signal previously stored in association with the channel estimation signal so as to calculate the second weighting factor.

7. A communication method comprising the steps of:
    detecting frequency hopping information of a received signal;
    weighting each of signals received by a plurality of antennas based on an signal to noise ratio of the received signals so as to operate the antennas as combining diversity systems, when frequency hopping is implemented; and
    weighting each of the signals received by the plurality of antennas so as to suppress an interference signal and to operate the antennas as adaptive array antennas, when frequency hopping is not implemented.

8. A communication system in which a sender and a receiver are connected through a wireless communication network, wherein the receiver comprises:
    a first weighting controller which weights each of signals received by a plurality of antennas based on an signal to noise ratio of the received signals so as to operate the antennas as combining diversity systems;
    a second weighting controller which weights each of the signals received by the plurality of antennas so as to suppress an interference signal and to operate the antennas as adaptive array antennas;
    a hopping information detector which detects frequency hoping information of the received signals; and
    a control switch which changes between an operation of the combining diversity systems and an operation of the adaptive array antennas based on the frequency hopping information.

9. A non-transitory computer readable medium storing a computer program which, when executed by a computer, performs a method, the method including:
    weighting each of signals received by a plurality of antennas based on an signal to noise ratio of the received signals so as to operate the antennas as combining diversity systems;
    weighting each of the signals received by the plurality of antennas so as to suppress an interference signal and to operate the antennas as adaptive array antennas;
    detecting frequency hopping information of the received signals; and
    changing between an operation of the combining diversity systems and an operation of the adaptive array antennas, based on the frequency hopping information.

* * * * *